United States Patent [19]
Moore et al.

[11] Patent Number: 5,779,269
[45] Date of Patent: Jul. 14, 1998

[54] PROPELLANT MODULE ASSEMBLY

[75] Inventors: Sanders H. Moore; Brian D. Sharpe, both of Cleveland, Tenn.

[73] Assignee: Olin Corporation, Charleston, Tenn.

[21] Appl. No.: 761,296

[22] Filed: Dec. 6, 1996

[51] Int. Cl.$^6$ ................................................. B60R 21/26
[52] U.S. Cl. ................................................. 280/741; 280/736
[58] Field of Search ................................... 280/741, 736, 280/737; 102/530, 531

[56] References Cited

U.S. PATENT DOCUMENTS

| | | |
|---|---|---|
| 3,147,592 | 9/1964 | Rose. |
| 3,162,123 | 12/1964 | Turner. |
| 3,667,219 | 6/1972 | Murfree, Jr. et al.. |
| 3,690,255 | 9/1972 | Vass et al.. |
| 3,810,655 | 5/1974 | Pracher. |
| 3,902,425 | 9/1975 | Kurtzemann. |
| 4,517,798 | 5/1985 | Roberts. |
| 4,856,271 | 8/1989 | Burke. |
| 4,938,932 | 7/1990 | Burke. |
| 5,201,542 | 4/1993 | Thuen et al. ................ 280/736 |
| 5,542,702 | 8/1996 | Green et al. ................ 290/741 X |
| 5,671,944 | 9/1997 | Ueda et al. ................ 280/737 |
| 5,673,933 | 10/1997 | Miller et al. ................ 280/736 |

*Primary Examiner*—Christopher P. Ellis
*Attorney, Agent, or Firm*—Gregory S. Rosenblatt; Wiggin & Dana

[57] ABSTRACT

A propellant module assembly is adapted for containing a liquid propellant which is used to inflate a vehicular air bag. The module assembly includes an igniter; a liquid propellant; a propellant and igniter capsule; and a rupturable closure member. The capsule and rupturable member are compatible with, and will not deteriorate as a result of contact with the liquid propellant. The liquid propellant, when ignited, will not produce toxic gases, and will not subject vehicle occupants to the possibility of chemical burns, as can occur with solid propellants.

21 Claims, 2 Drawing Sheets

PROPELLANT MODULE ASSEMBLY

1. FIELD OF THE INVENTION

This invention relates to a propellant module assembly for use in a vehicle air bag system. More particularly, this invention relates to an air bag inflation system that utilizes a liquid propellant as the source of inflation gas for the air bag.

2. DESCRIPTION OF THE PRIOR ART

Inflatable air bags are widely used in automobiles for protecting passengers against injury in the event of a collision. The bags are disposed in the vehicle in a collapsed condition inside of the dashboard, steering wheel hub, seats, door panels and the like. The assembly includes collision sensors which, when activated, are operable to cause the air bags to be inflated. The inflation gas may be derived from a stored source of compressed gas on board the vehicle, or the gas may be generated by the combustion of a combination of solid propellant materials.

One component of many of the solid propellant systems commonly used to inflate automotive air bags is sodium azide. Sodium azide containing propellant gas sources are characterized by good stability, reliability and size. However, the sodium azide solid propellants currently in use have certain drawbacks. Firstly, the propellant inflation gases resulting from combustion contain small amounts of various toxic species. Secondly, a solid by-product of combustion is sodium oxide, NaO. When NaO combines with moisture, caustic sodium hydroxide, NaOH, can form. The caustic presents the danger of causing chemical burns to vehicle occupants. Thirdly, the propellant burn rate of solid propellants is uncontrolled. Once ignited, the entire volume of solid propellant is rapidly consumed, quickly generating a copious amount of inflation gas. The inflation gas inflates the gas bag very quickly driving the air bag into the passenger compartment at high velocity. The forces inherent in the rapidly accelerating air bag have been known to injure or kill children and small adults.

It would be desirable to have the advantages of using a propellant inflation gas source for an air bag inflation system which does not produce toxic gases; does not create the possibility of causing chemical burns to passengers; and wherein the air bag is deployed at a controlled rate.

SUMMARY OF THE INVENTION

Accordingly, it is an object of the invention to provide a vehicle air bag inflation system which derives the inflation gas from a liquid propellant. The liquid propellant is contained in a sealed, but rupturable, capsule. The liquid propellant is preferably formed from a mixture of hydroxyammonium nitrate (HAN); triethanolammonium nitrate (TEAN); and water. When burned, the propellant produces oxygen, nitrogen, carbon dioxide, and water vapor, none of which are toxic and none of which can cause chemical burns. The liquid propellant is contained in a capsule formed from a material which will not react with the propellant, and which has a rupturable membrane closure. The capsule is sealed so as to prevent evaporation of water from the propellant. The capsule material also protects the propellant from adverse results of thermal cycling which can occur in an automobile. In order to meet the thermal cycling requirement, thermal conductivity of the capsule material is relatively low, and preferably is within the range of about 0.70 to about 0.87 BTU inch per (hr.$\times$ft$^2$) degrees F.

It is therefore an object of this invention to provide a vehicle air bag inflation system that uses a liquid propellant as a source of inflation gas.

It is an additional object of this invention to provide an air bag inflation system of the character described wherein non-toxic inflation gases are produced.

It is a further object of this invention to provide an air bag inflation system of the character described wherein the inflation gases produced are incapable of causing chemical burns.

It is an additional object of this invention to provide an air bag inflation system of the character described wherein controlled combustion of the air bag inflation propellant is facilitated.

It is another object of this invention to provide an air bag inflation system of the character described wherein the liquid propellant is contained in a sealed and thermally protective capsule.

These and other objects and advantages of the invention will become more readily apparent from the following detailed description of several embodiments thereof when taken in conjunction with the accompanying drawings in which:

DETAILED DESCRIPTION

Figure 1:
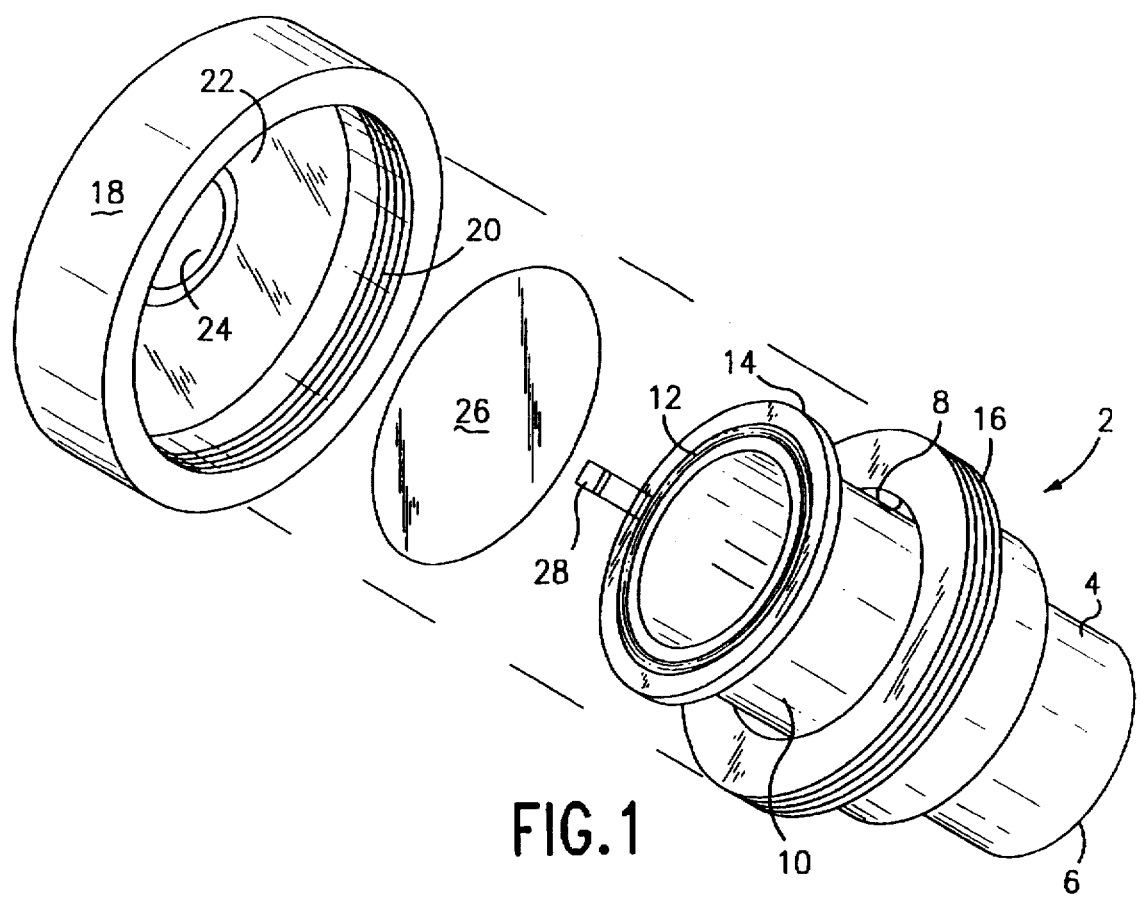
FIG. 1 is an exploded perspective view of one embodiment of a liquid propellant capsule assembly formed in accordance with this invention.

Referring now to FIG. 1, there is shown a liquid propellant capsule assembly denoted generally by the numeral 2, which is formed in accordance with this invention. The capsule 2 includes a cup-shaped member 4 having a closed end 6 and an opposite open end 8. A backing ring 10 which may be formed from a non-reactive plastic material is disposed in the member 4 and carries an elastomeric seal ring 12 in a radial flange 14.

The elastomeric seal ring 12 is formed from any material that will separate cleanly from the radial flange 14. This is particularly important when the backing ring 10 is formed from metal to prevent metal particles removed from the radial flange during separation of the elastomeric seal ring from entering the gas stream and potentially ripping the air bag. Almost any compressible elastomer that enables the formation of an air tight seal can be used. Preferably, the elastomer is coated with polytetrafluoroethylene ("TEFLON" manufactured by DuPont of Wilmington, Del.).

The exterior of the member 4 is provided with threads 16. For ease of assembly and to provide a tight seal, a thread density of between 5 and 10 threads per inch is employed. A preferred thread density is from 7 to 8 threads per inch.

The liquid propellant is contained within the member 4 and backing ring 10. Any liquid propellant that generates copious amounts of gas at a gas temperature of below about 3000° F. (1650° C.) may be utilized. Preferably, the gas temperature is below about 2500° F. (1370° C.). Suitable propellants include both aqueous and non-aqueous solutions of nitrate salts containing an oxidizer and a fuel.

An exemplary liquid propellant consists essentially of, by weight:

50%–60% HAN,
20%–30% TEAN, and
an effective amount of a coolant to reduce the gas temperature to below 2500° F.

Suitable coolants include water and methanol. The effective amount of water is typically in excess of 22%, by weight, and the exemplary liquid propellant composition disclosed above typically contains from 23%–28%, by weight, of water.

A preferred liquid propellant composition consists essentially of, by weight, 56.25% HAN, 18.75% TEAN and the balance water.

The assembly 2 also includes a closure cap 18 having internal threads 20 which mate with the threads 16. The cap 18 has an annular bearing surface 22 which surrounds a gas discharge port 24. A closure membrane 26 is sandwiched between the member 4 and the cap 18.

The closure membrane 26 is preferably formed from a polymer that is inert in the liquid propellant, although suitable metallic foils may also be used. One suitable material for the closure member 26 is a fluoroethylene polymer film The film has a thickness effective to rupture at a desired gas pressure that is typically less than 40 psi, and preferably between 30 psi and 35 psi for a single stage gas generator. Films of various thicknesses can be employed in multi-stage gas generators as described below.

A suitable fluoroethylene polymer for the single stage gas generator has a thickness of between 500 Å and 2000 Å with the preferred thickness being about 1,000 Å.

The cap 18 compresses the closure membrane 26 between the bearing surface 22 and the sealing ring 12 thus providing a rupturable sealed closure for the assembly 2. A squib 28 is disposed inside of the assembly 2 in contact with the liquid propellant. When a collision is sensed, such as by a remote sensor, the squib 28 is activated to ignite the liquid propellant. The squib 28 is preferably formed from an electrically ignitable formulation, such as boron—potassium nitrate (BKNO$_3$), but could be formed from an impact ignitable formulation.

The closure membrane 26 is designed to rupture at a desired pressure of about 35 psi, or at the vapor pressure of water at 140° F. under operating conditions, so as to release the inflation gases from the assembly 2.

The member 4, backing ring 10 and cap 18 are preferably formed, for example, from materials that are compatible with the propellant. By compatible, we mean that the material properties will not deteriorate to an unusable extent when in extended (10 years and more) contact with the liquid propellant formuation at temperatures experienced in automotive applications (Le. under the hood temperature ranges of −50° C. to +200° C.). Such metals, referred to herein as "noble" metals include titanium, tantalum, niobium, alloys thereof and passivated stainless steel.

Alternatively, the member 4 is lined with a noble metal or with an inert polymer to provide a propellant contacting surface that is compatible with the propellant constituents. Deleterious reactions between the propellant and the capsule will therefore not occur. The propellant will therefore maintain its integrity for extended periods of time. For example, a propellant capsule formed from forged grade 2 titanium can provide the necessary thermal stability and can maintain propellant integrity over extended periods of time.

Figure 2:
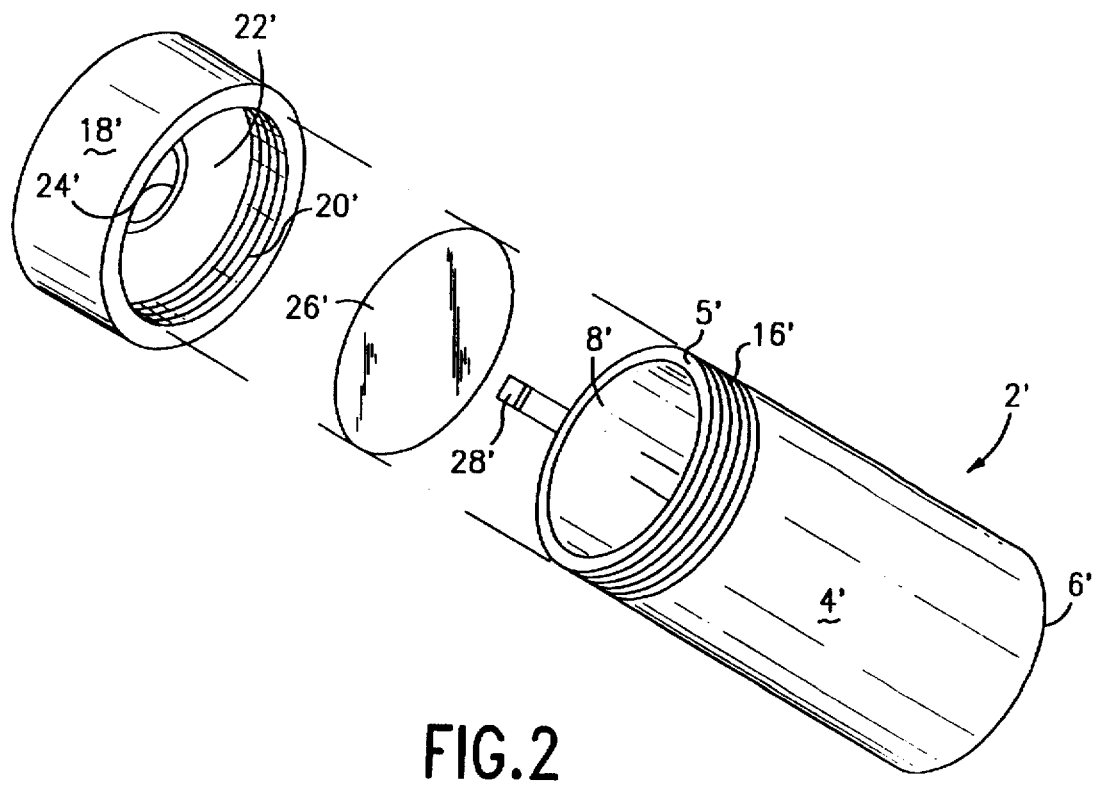
FIG. 2 is a view similar to FIG. 1 but showing a second embodiment of a liquid propellant capsule assembly formed in accordance with this invention.

Referring now to FIG. 2, there is shown an alternative embodiment of a liquid propellant capsule assembly 2' formed in accordance with this invention. The assembly 2' includes a cup-shaped member 4' having a closed end 6' and an open end 8' having external threads 16'. The member 4' contains the liquid propellant and an ignition squib 28', both of the same type as described herein before. The assembly 2' includes a closure cap 18' which has internal threads 20', an annular bearing wall 22' and a control gas expulsion opening 24'. A rupturable membrane 26' of the type described herein before is sandwiched between the member 4' and the bearing wall 22' to seal the interior of the member 4' to seal the interior of the member 4'. The membrane 26' is pinned between the bearing wall 22' and an end wall 5 on the member 4'. The cap 18' and member 4' are preferably formed from an injection molded plastic which is non-reactive with the liquid propellant. Suitable plastics include various conventional polyethylene terephthalate resins which are marketed under the trademark "Teflon". A particularly preferred plastic is polyvinylidene fluoride (PVDF). A suitable PVDF resin is manufactured by Asahi American Corp. and sold under the trademark "Super Proline".

It will be readily appreciated that the air bag inflation liquid propellant assembly will provide a thermally stable inflator which ensures extended propellant integrity. The mating threads on the cap and propellant cup can be formed so as to resist separation. One-way locking threads can be used; adhesive-bearing threads can be used; and selectively disengaging threads such as are used on medication containers can also be used. The threads are preferably coarse threads so as to facilitate quick assembly of the assemblies. The connection between the cap and the propellant cup should be easy to form and difficult to break. The use of a non-reactive rupturable membrane to seal the propellant from ambient surroundings ensures the integrity of the propellant while at the same time allowing propellant gas release without fragment proliferations which could deleteriously affect system performance.

Figure 3:
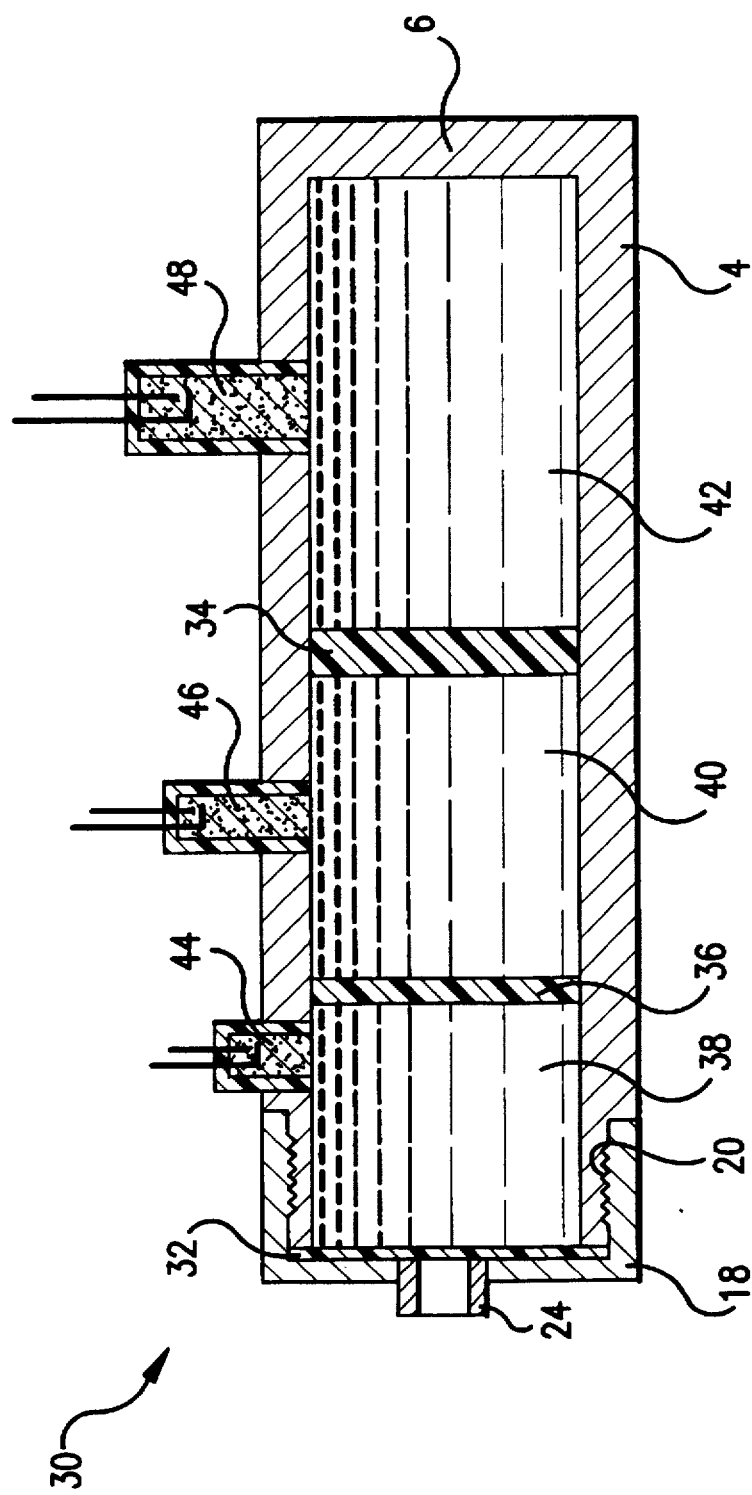
FIG. 3 is a cross sectional representation of liquid propellant capsule assembly capable of generating variable volume of inflation gas.

FIG. 3 illustrates in cross sectional representation a vehicle air bag assembly 30 that provides a controlled volume of gas to the gas discharge port 24. A lesser volume of gas, and reduced rate of air bag inflation, is desired when the crash is at a relatively low speed (for example, less than 20 miles per hour) or when the vehicle occupant to be contacted by the air bag is light weight (for example, weighing less than 80 pounds).

The assembly 30 includes a member 4 and closure cap 18, as described above, typically joined together by threads 20. A plurality of closure membranes separate the liquid propellant into multiple discrete compartments. A foremost closure membrane 32 is adjacent to the gas discharge port 24 while a rearmost closure membrane 34 is adjacent to, but spaced from, the closed end 6 of the member 4. Optionally disposed between the foremost closure member 32 and the rearmost closure member 34 are one or more intermediate closure membranes 36.

Pairs of adjoining closure membranes define propellant compartments. In FIG. 3, the foremost closure membrane 32 and the intermediate closure membrane 36 define a foreward propellant compartment 38, while the intermediate closure membrane 36 and the rearmost closure membrane 34 define a first intermediate propellant compartment 40 and the rearmost closure membrane 34 and the closed end 6 define a rearward propellant compartment 42.

Each individual closure membrane is selected to rupture at a desired pressure, subject to the foremost closure membrane 32 rupturing at the lowest pressure and each rewardly succeeding adjacent membrane rupturing at a higher pressure until the rearmost closure membrane 34 that ruptures at the highest desired pressure. Correspondingly, the foreward propellant compartment 38 has the smallest volume of liquid propellant to generate the lowest gas pressure and each adjacent succeeding compartment is of larger volume to generate a correspondingly larger gas pressure.

A plurality of squibs are electrically interconnected to sensors, not shown, that determine, based on conditions such as crash velocity and occupant weight, a desired volume of gas to inflate the air bag. If a small volume of gas is required, only the foremost squib 44 is actuated. Actuation of the foremost squib 44 ignites the propellant in the foreward propellant compartment 38 generating sufficient gas pressure to rupture the foremost closure membrane 32, but not the intermediate closure membrane 36. If a larger gas volume is required, a mid-squib 46 is actuated igniting the propellant in a mid-liquid propellant compartment generating sufficient gas pressure to rupture the intermediate closure membrane 36 thereby igniting the propellant in the foreward propellant compartment 38 and further rupturing the foremost closure membrane 32.

For maximum gas pressure, the rearmost squib 48 is actuated generating a gas pressure sufficient to rupture the rearmost closure membrane 34 and each forwardly successive membrane as well.

Typically, the rearmost closure membrane 34 is selected to rupture at a gas pressure of between 35 and 40 psi, the intermediate closure membrane 36 at a gas pressure of between 30 and 35 psi and the foremost closure membrane 32 at a gas pressure of between 20 and 30 psi. It is believed that for the 56.25% HAN; 18.75% TEAN; 25% $H_2O$ liquid propellant, the foreward propellant compartment 38 should be sized to contain about 75 ml of propellant, the intermediate propellant compartment 40 to contain about 100 ml of propellant and the rearmost propellant compartment 42 to contain about 150 ml of propellant.

Since many changes and variations of the disclosed embodiments of the invention may be made without departing from the inventive concept, it is not intended to limit the invention otherwise than as required by the appended claims.

We claim:

1. A vehicle air bag inflation assembly comprising:
   a) a canister having a cup-shaped member and a closure cap, said closure cap being sealed onto said cup-shaped member, and said closure cap including a central opening forming an inflation gas outlet port in the canister;
   b) a rupturable membrane sandwiched between said cup-shaped member and said closure cap;
   c) a seal ring sandwiched between said cup-shaped member and said membrane, said seal ring and said membrane being operable to seal an interior portion of said canister from ambient surroundings; and
   d) a liquid propellant formulation disposed in the interior portion of said canister, said liquid propellant formulation being operable when ignited, to produce an inflation gas which is non-toxic and incapable of inflicting chemical burns on vehicle passengers.

2. The assembly of claim 1 wherein said cup-shaped member and said cap are sealed by threads which resist disassembly of said canister.

3. The assembly of claim 2 wherein said cup-shaped member and said cap are sealed by threads having a thread density of between 5 threads per inch and 10 threads per inch.

4. The assembly of claim 2 wherein said cup-shaped member and said closure cap are individually selected from the group consisting of titanium, tantalum, niobium, alloys thereof, passivated stainless steels and compatible polymer resins.

5. The assembly of claim 4 wherein both said cup-shaped member and said closure cap are formed from titanium.

6. The assembly of claim 5 wherein both said cup-shaped member and said closure cap are formed from polyvinylidene fluoride.

7. The assembly of claim 2 wherein at least one of said cup-shaped member and said closure cap is lined with a resinous liner which is compatible with said propellant.

8. The assembly of claim 4 wherein said rupturable membrane is selected from the group consisting of metallic foils and polymer films that rupture at a gas pressure of less than 40 psi.

9. The assembly of claim 8 wherein said rupturable membrane is a fluoroethylene polymer film having a thickness of from 500 Å to 2000 Å.

10. The assembly of claim 9 wherein said liquid propellant formulation consists essentially of, by weight, 50%–60% of HAN, 20%–30% of TEAN, and the balance a coolant.

11. The assembly of claim 10 wherein said coolant is water present in an amount of at least 22%, by weight.

12. A vehicle air bag inflation assembly comprising:
   a) a canister having a cup-shaped member and a closure cap, said closure cap being sealed onto said cup-shaped member, and said closure cap including a central opening forming an inflation gas outlet port in the canister;
   b) a plurality of rupturable membranes disposed between said cup-shaped member and said closure cap wherein a forewardmost of said rupturable membranes is adjacent to said central opening and ruptures at a desired gas pressure, each rearwardly succeeding ones of said ruptuable members rupturing at a progressively higher gas pressue;
   c) a seal ring sandwiched between said cup-shaped member and said forewardmost rupturable membrane, said seal ring and said forewardmost rupturable membrane being operable to seal an interior portion of said canister from ambient surroundings; and
   d) a liquid propellant formulation disposed in a plurality of interior compartments of said canister bounded by respective ones of said rupturable membranes, said liquid propellant formulation being operable when ignited, to produce an inflation gas which is non-toxic and incapable of inflicting chemical burns on vehicle passengers.

13. The assembly of claim 12 wherein each of said interior compartments is in communication with a respective squib effective to ignite said liquid propellant formulation contained therein.

14. The assembly of claim 13 wherein each respective interior compartment has a volume of said liquid propellant formuation effective to generate a gas pressure capable of rupturing said rupturable membranes forwardly disposed from said respective interior compartment but incapable of rupturing said rupturable membranes rewardly disposed from said respective interior compartment.

15. The assembly of claim 14 wherein said cup-shaped member and said cap are sealed by threads which resist disassembly of said canister.

16. The assembly of claim 15 wherein said cup-shaped member and said closure cap are individually selected from the group consisting of titanium, tantalum, niobium, alloys thereof, passivated stainless steels and compatible polymer resins.

17. The assembly of claim 15 wherein at least one of said cup-shaped member and said closure cap is lined with a compatible resinous liner.

18. The assembly of claim 15 wherein said plurality of rupturable membranes are individually selected from the group consisting of metallic foils and polymer films that rupture at a gas pressure of less than 40 psi.

19. The assembly of claim 18 wherein said rupturable membranes are fluoroethylene polymer films having a thickness of between 500 Å and 2000 Å.

20. The assembly of claim 19 wherein said liquid propellant formulation consists essentially of, by weight, 50%–60% of HAN, 20%–30% of TEAN, and the balance a coolant.

21. The assembly of claim 20 wherein said coolant is water present in an amount of at least 22%, by weight.

* * * * *